United States Patent [19]

Nakamura et al.

[11] Patent Number: 5,244,743
[45] Date of Patent: Sep. 14, 1993

[54] MAGNETIC RECORDING MEDIUM COMPRISING A BINDER MIXTURE OF TWO SPECIFIED VINYL CHLORIDE COPOLYMERS

[75] Inventors: Katsuya Nakamura; Eitaro Nakamura, both of Tokyo, Japan

[73] Assignee: Nippon Zeon Co., Ltd., Tokyo, Japan

[21] Appl. No.: 484,329

[22] Filed: Feb. 26, 1990

[30] Foreign Application Priority Data

Feb. 28, 1989 [JP] Japan ................................ 1-47363

[51] Int. Cl.$^5$ .............................................. G11B 5/00
[52] U.S. Cl. ................................ 428/522; 428/694 B; 428/900
[58] Field of Search ........................ 428/900, 694, 522

[56] References Cited

U.S. PATENT DOCUMENTS

| | | | |
|---|---|---|---|
| 4,600,521 | 7/1986 | Nakamura et al. | 252/62.54 |
| 4,743,501 | 5/1988 | Eguchi et al. | 428/328 |
| 4,770,941 | 9/1988 | Imai et al. | 428/411.1 |
| 4,784,913 | 11/1988 | Nakamura et al. | 428/411.1 |
| 4,842,942 | 6/1989 | Yatsuka et al. | 428/425.9 |
| 4,851,465 | 7/1989 | Yamakawa et al. | 524/431 |
| 4,861,683 | 8/1989 | Nakachi et al. | 428/694 |
| 4,900,631 | 2/1990 | Yamakawa et al. | 428/483 |

FOREIGN PATENT DOCUMENTS 62-8329 1/1987 Japan.

*Primary Examiner*—Paul J. Thibodeau
*Assistant Examiner*—Stevan A. Resan
*Attorney, Agent, or Firm*—Armstrong, Westerman, Hattori, McLeland & Naughton

[57] ABSTRACT

Disclosed is a magnetic recording medium having a magnetic layer comprising a vinyl chloride copolymer as a binder and a magnetic powder and formed on a non-magnetic support. The binder is a mixture comprised of (a) a vinyl chloride copolymer having a quaternary ammonium salt and a hydroxyl group and (b) a vinyl chloride copolymer having at least one anionic hydrophilic group selected from carboxylic acids, sulfur-containing acids, phosphorus-containing acids, and salts thereof, and a hydroxyl group. The ratio of copolymer (a) to copolymer (b) is such that the equivalent ratio of the quaternary ammonium salt in copolymer (a) to the anionic hydrophilic group in copolymer (b) is from 0.2 to 5.

8 Claims, No Drawings

MAGNETIC RECORDING MEDIUM COMPRISING A BINDER MIXTURE OF TWO SPECIFIED VINYL CHLORIDE COPOLYMERS

BACKGROUND OF THE INVENTION

1. Field of the Invention

This invention relates to a magnetic recording medium such as a magnetic tape, a magnetic card or a magnetic disk. More particularly, it relates to an improvement of a binder contained in a magnetic layer formed on a non-magnetic support.

2. Description of the Related Art

In general, a magnetic recording medium such as a magnetic tape or a floppy disk is prepared by coating a magnetic paint formed by dispersing a ferromagnetic powder together with an organic polymer as a binder in an organic solvent, on a polymeric film or sheet.

Due to a recent increase in the demand for a higher recording density and a higher S/N ratio of the magnetic recording material, the particle size of the magnetic powder has been made finer and the coercive force of the magnetic powder increased, and therefore, the dispersing capacity of the binder is an important factor when dispersing the magnetic powder uniformly in the magnetic paint, forming a smooth magnetic layer having a high degree of filling, and improving the performance of the binder.

As the dispersibility of the finely divided magnetic powder is increased, the viscosity of the magnetic paint is increased and problems often arise at the coating step. Therefore, it is necessary to increase the dispersibility of the magnetic powder while controlling the viscosity of the paint.

To improve the dispersion state of the magnetic powder and the viscosity characteristics of the magnetic paint, usually a method is adopted in which a surface active agent having a low molecular weight is used as the dispersant, but in view of the durability of the magnetic recording medium and a prevention of contamination of the head, the amount of dispersant used is naturally limited, and to improve the reliability of the magnetic recording medium, the binder must have a dispersing capacity. Separately, a method in which a curable compound represented by a polyisocyanate compound is incorporated into a paint, whereby the formed magnetic layer is crosslinked, is customarily adopted for increasing the durability and reliability of the recording medium, especially in the field of a recording magnetic tape, and in this case, the binder must have an appropriate reactivity with the polyisocyanate. If this reactivity is too high, however, the pot life of the paint is short and the paint is disadvantageous from the economical viewpoint. If the reactivity is too low, the desired improvement of the durability or travelling property cannot be obtained.

With a view to improving the binder, to cope with this increase of the performance of the magnetic recording medium, especially in connection with polyvinyl chloride (PVC) binders, the inventors investigated known PVC binders, and found the following. In a vinyl chloride/vinyl alcohol/vinyl acetate copolymer, the dispersing capacity for the magnetic powder is increased with an increase of the ratio of the vinyl alcohol, but the degree of improvement is low and the aid of a dispersant is necessary. Furthermore, as the proportion of the vinyl alcohol is increased, the pot life becomes short and the moisture resistance of the coating becomes low, and furthermore, the rate of thermal decomposition is increased. A vinyl chloride/maleic acid/vinyl acetate copolymer is fully adsorbed in the magnetic powder and exerts an excellent dispersing capacity, but an increase of the viscosity or gelation readily occurs and the reaction with the polyisocyanate tends to occur locally.

As the means for solving the problems of typical PVC binders, there have been proposed a method in which parts of OH groups of a vinyl chloride/vinyl alcohol/vinyl acetate copolymer are substituted with an organic group having a hydrophilic group such as COOM, $S_3M$, $S_4M$ or $PO(OM)_2$ in which M represents hydrogen, an alkali metal or ammonium (Japanese Unexamined Patent Publication No. 57-44227), a method in which a vinyl chloride/vinyl acetate copolymer having a hydrophilic group as mentioned above is saponified (Japanese Unexamined Patent Publication No. 58-114330, No. 61-57640 and No. 61-96515), and a method in which a vinyl chloride/vinyl alcohol/vinyl acetate copolymer having an anionic hydrophilic group introduced therein us used. According to these proposals, the dispersibility is improved but the level of improvement level is still too low, and since these methods include the saponification step, the heat stability of the polymers is poor and in magnetic recording media formed by using these polymers, there is a risk of a reduction of the reliability thereof with time.

Furthermore, a method has been proposed in which a copolymer of a hydroxyl group-containing monomer such as hydroxylethyl (meth)acrylate or hydroxylpropyl (meth)acrylate with an ion-dissociative hydrophilic group-containing monomer is used so that deterioration of the polymer by the saponification is avoided (Japanese Unexamined Patent Publication No. 56-77930, No. 60-185226 and No. 60-235814). In this case, the dispersibility and heat stability are improved, compared with the case where the polymer comprising vinyl alcohol units is used as the hydroxyl group-containing units, but the improvement is still unsatisfactory. Furthermore, in this method, as the dispersibility is increased, the viscosity of the paint is increased, and problems readily arise at the coating step.

Furthermore, a method has been proposed in which the dispersibility of a magnetic powder is improved by introducing a cationic hydrophilic group represented by a quaternary ammonium salt in polyvinyl chloride containing a hydroxyl group (Japanese Unexamined Patent Publication No. 62-73416 and Japanese Unexamined Patent Publication No. 62-134819). Nevertheless, the pot life after the addition of an isocyanate compound is short and problems readily arise with time in the coating process, although the viscosity of the magnetic paint before the addition of the isocyanate compound is low.

A lubricant represented by a fatty acid is added to a magnetic paint to maintain a good travelling performance, but if the heretofore proposed vinyl chloride binders contain a hydroxyl group in an amount sufficient to impart a required degree of crosslinking by the reaction with the polyisocyanate, as pointed out above, the problem arises of a reduction of the dispersion stability of the magnetic paint, and this tendency becomes conspicuous as the particle size of the magnetic powder is decreased.

SUMMARY OF THE INVENTION

A primary object of the present invention is to solve the problems involved in the preparation of the conventional magnetic recording medium comprising a polyvinyl chloride type binder containing a hydrophilic group and a hydroxyl group, namely, to provide a specific vinyl chloride copolymer binder exhibiting a good magnetic powder-dispersing property and a good stability of the dispersion with the lapse of time, a good reactivity with a polyisocyanate, a good pot life, and a relatively low viscosity of the paint even if a fine magnetic powder is dispersed at a high concentration. A magnetic recording medium obtained by coating a magnetic paint comprising this polyvinyl chloride binder, a polyisocyanate as the curing agent, and a magnetic powder, on a polyester film has good magnetic characteristics, electro-magnetic conversion characteristics and durability.

In accordance with the present invention, there is provided a magnetic recording medium having a magnetic layer comprising a vinyl chloride copolymer as a binder and a magnetic powder and formed on a non-magnetic support, characterized in that the binder is a mixture comprising (a) a vinyl chloride copolymer having a quaternary ammonium salt and a hydroxyl group and (b) a vinyl chloride copolymer having at least one anionic hydrophilic group selected from the group consisting of carboxylic acids, sulfur-containing acids, phosphorus-containing acids, and salts thereof, and a hydroxyl group.

DESCRIPTION OF THE PREFERRED EMBODIMENTS

The hydroxyl group of each of the vinyl chloride copolymer (a) and (b) used in the present invention is introduced by a copolymerization of a hydroxyl group-containing monomer with vinyl chloride. As examples of the hydroxyl group-containing monomer for giving a hydroxyl group to the vinyl chloride copolymer (a), there can be mentioned, esters of $\alpha,\beta$-unsaturated acids with alkanols having 2 to 8 carbon atoms, such as 2-hydroxyethyl (meth)acrylate and 2-hydroxypropyl (meth)acrylate, esters of (meth)acrylic acid with polyalkylene glycols represented by the formula $CH_2=CR-COO+C_nH_{2n}O)_{\overline{m}}H$ in which m is an integer of from 2 to 9, n is an integer of from 2 to 4 and R represents a hydrogen atom or a methyl group, mono-(meth)acrylic esters of dihydroxyesters of dicarboxylic acids, such as 2-hydroxyethyl-2'-(meth)acryloyloxyphthalate and 2-hydroxyethyl-2'-(meth)acryloyloxy-succinate, (meth)acrylamides such as N-methylol (meth)acrylamide, alkylene glycol esters of unsaturated carboxylic acids such as di-2-hydroxyethyl maleate, di-4-hydroxybutyl maleate and di-2-hydroxypropyl itaconate, olefin alcohols such as 3-buten-1-ol and 5-hexen-1-ol, vinyl ethers such as 2-hydroxyethyl vinyl ether and 2-hydroxyethyl vinyl ether; mono-(meth)allyl ethers and mono-(meth)allyl thioethers, for example, mono-(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether and (meth)allyl-6-hydroxyhexyl ether, mono-(meth)allyl ethers of polyoxyalkylene glycols such as diethylene glycol mono-(meth)allyl ether and dipropylene glycol mono-(meth)allyl ether, glycerol mono-(meth)allyl ether, mono-(meth)allyl ether of halogen-substituted or hydroxyl-substituted (poly)alkylene glycols, such as (meth)allyl-2-chloro-3-hydroxypropyl ether and (meth)allyl-2-hydroxy-3-chloropropyl ether, and (meth)allyl thioethers of alkylene glycols such as (meth)allyl-2-hydroxyethyl thioether and (meth)allyl-2-hydroxypropyl thioether; and vinyl alcohol and (meth)allyl alcohol. Among the above, mono-(meth)allyl ethers and mono-(meth)allyl thioethers are preferable from the viewpoint of the heat stability and reactivity.

The amount of the hydroxyl group incorporated in each of the copolymers (a) and (b) is 0.05 to 3.0% by weight, preferably 0.1 to 2.0% by weight. If the amount of the hydroxyl group is smaller than 0.05% by weight, the effect of crosslinking with the polyisocyanate compounds is not obtained, and if the amount of the hydroxyl group is larger than 3.0% by weight, the pot life of the magnetic paint becomes too short.

As the method of giving a quaternary ammonium salt to the vinyl chloride copolymer (a) used in the present invention, there can be mentioned a first method in which a quaternary ammonium salt-containing monomer is copolymerized.

As the quaternary ammonium salt-containing monomer, there can be mentioned diallyldimethylammonium chloride, diallyldimethylammonium stearate, 2-hydroxy-3-allyloxypropyltrimethylammonium chloride, vinylbenzyltrimethylammonium chloride, (meth)acryloyloxyethyltrimethylammonium chloride, 2-hydroxy-3-methacryloyloxypropyltrimethylammonium chloride, (meth)acryloyloxypropyldimethylbenzylammonium chloride and (meth)acrylamidopropyltrimethylammonium chloride.

As another method of introducing a quaternary ammonium salt in the vinyl chloride copolymer (a), there can be mentioned a method in which a vinyl chloride copolymer containing an epoxy group is reacted with a tertiary amine in the presence or absence of an acid, which is described in detail in Japanese Unexamined Patent Publication No. 63-121117.

As the tertiary amine used in this method, there can be mentioned saturated tertiary amines such as pyridine, dimethyllaurylamine, triethylamine and diethylethanolamine, and unsaturated tertiary amines such as diethylaminoethyl (meth)acrylate and dimethylaminopropyl (meth)acrylate. The introduction of the epoxy group to be reacted with the tertiary amine into the vinyl chloride copolymer can be accomplished by copolymerization with a monomer containing an epoxy group or by epoxidization of double bonds, formed by dehydrochlorination of a vinyl chloride copolymer with an alkali or by application of heat, with a peracid or the like. As the epoxy group-containing monomer, there can be mentioned allyl glycidyl ether, vinylcyclohexene monooxide and glycidyl (meth)acrylate. Especially when vinyl chloride copolymerized with allyl glycidyl ether is used, by making water or an appropriate acid present at the reaction with the tertiary amine, the hydration reaction of the epoxy group occurs simultaneously with the formation of the quaternary ammonium salt by the tertiary amine and epoxy group, and the copolymer (a) used in the present invention can be prepared by one step:

The amount of the quaternary ammonium salt incorporated in the copolymer (a) used in the present invention is preferably 0.02% to 0.5% by weight as calculated as nitrogen and based on the weight of the copolymer (a). If the amount of the quaternary ammonium salt is smaller than 0.02% by weight, the magnetic powder-dispersing effect is not obtained, and if the amount of the quaternary ammonium salt is larger than 0.5% by weight, the moisture resistance of the medium becomes low.

The anionic hydrophilic group selected from a carboxylic acid, a sulfur-containing acid, a phosphorous-containing acid or a salt thereof can be introduced into the vinyl chloride copolymer (b) used in the present invention by copolymerization of vinyl chloride with these acids. As the monomer for providing the anionic hydrophilic group, there can be mentioned unsaturated mono-and di-carboxylic acids such as acrylic acid, methacrylic acid, maleic acid, itaconic acid, crotonic acid and vinylacetic acid, monoalkyl esters of unsaturated dicarboxylic acids such as monomethyl maleate, mono-2-hydroxyethyl maleate, monobutyl itaconate, and mono-2-hydroxypropyl itaconate; sulfur-containing acids and phosphorus-containing acids, such as sulfonic acid, sulfuric acid, phosphoric acid, and phosphonic acid; and radical-polymerizable monomers containing alkali metal or ammonium salts of the foregoing acids. Sulfonic acid and salts thereof are easily available and include various kinds. For example, there can be mentioned acids such as vinylsulfonic acid, methylvinylsulfonic acid, (meth)allylsulfonic acid, styrenesulfonic acid, ethyl (meth)acrylic-2-sulfonate, 2-acrylamido-2-methylpropanesulfonic acid and 3-allyloxy-2-hydroxypropanesulfonic acid, and alkali metal salts and ammonium salts of these acids. As examples of the monomer having sulfuric acid or a salt thereof, there can be mentioned acids such as ethyl (meth)acrylic-2-sulfate and 3-allyloxy-2-hydroxypropanesulfuric acid, and alkali metal salts and ammonium salts thereof. As examples of the monomer having phosphoric acid or a salt thereof, there can be mentioned propyl (meth)acrylic-3-chloro-2-phosphate, ethyl (meth)acrylic-2-phosphate, and 3-allyloxy-2-hydroxypropanephosphoric acid, and alkali metal salts and ammonium salts thereof. As examples of the monomer having phosphonic acid or a salt thereof, there can be mentioned acids such as vinylphosphonic acid, acrylamidomethane-phosphonic acid, ethyl 2-phosphonate(meth)acrylate and 3-allyloxy-2-hydroxypropanephosphonic acid, and alkali metal salts and ammonium salts of the foregoing acids.

In connection with the preparation of the vinyl chloride copolymer (b) used in the present invention, another method can be employed in which an epoxy group-containing monomer is copolymerized with a hydroxyl group-containing monomer and vinyl chloride, wherein an alkali metal or ammonium salt of a carboxylic acid or a sulfur- or phosphorus- containing acid is added to the site of the epoxy group in the aqueous or non-aqueous system during the copolymerization reaction or before or after the copolymerization reaction. As the alkali metal or ammonium salt of the sulfur- or phosphorus-containing acid used in this method, there can be mentioned potassium phosphite, sodium thiosulfate, ammonium hydrogensulfate, disodium hydrogenphosphate, ammonium hydrogenphosphite, potassium sulfanilate, potassium persulfate, and sodium perphosphate. The method of the addition of a salt of a strong sulfur- or phosphorus-containing acid in the copolymerization of the epoxy group-containing monomer and vinyl chloride is described in detail in Japanese Unexamined Patent Publication No. 60-238306, No. 60-238371 and No. 61-53367.

Preferably, the amount of such anionic hydrophilic groups in the copolymer (b) is such that the molecular weight (equivalent) of the copolymer per anionic hydrophilic group is from 4,000 to 40,000. If the equivalent is smaller than 4,000, the moisture resistance of the magnetic recording medium is reduced, and if the equivalent is larger than 40,000, the intended effect of the present invention is not manifested.

For the polymerization for obtaining the vinyl chloride copolymers (a) and (b) used in the present invention, other copolymerizable monomer can be used according to need. As examples of the other comonomer, there can be mentioned vinyl esters of carboxylic acids such as vinyl acetate and vinyl propionate, vinyl ethers such as methyl vinyl ether, isobutyl vinyl ether and cetyl vinyl ether, vinylidene compounds such as vinylidene chloride and vinylidene fluoride, unsaturated carboxylic acid anhydrides such as maleic anhydride and itaconic anhydride, alkyl esters of unsaturated carboxylic acids such as diethyl maleate, dibutyl maleate, diethyl itaconate, methyl (meth)acrylate and ethyl (meth)acrylate, olefins such as ethylene and propylene, unsaturated nitriles such as (meth)acrylonitrile, aromatic vinyl compounds such as styrene, α-methylstyrene and p-methylstyrene, and epoxy group-containing monomers such as allyl glycidyl ether, glycidyl methacrylate and vinylcyclohexene monooxide.

These comonomers are used for improving the solubility of the copolymer while adjusting the compatibility of the copolymer with mother resin and the softening point of the copolymer.

The degree of polymerization of the vinyl chloride copolymers (a) and (b) is 200 to 900, preferably 250 to 500. If the degree of polymerization is lower than 200, the abrasion resistance of the magnetic layer is too low, and if the degree of polymerization is higher than 900, the viscosity of the paint is high and the dispersion of the magnetic powder is often poor.

The mixing ratio of the vinyl chloride copolymers (a) and (b) is preferably such that the equivalent ratio of the quaternary ammonium salt to the anionic hydrophilic group is in the range of from 0.2 to 5. If the ratio is outside this range, the intended effect of the present invention is not obtained.

The vinyl chloride copolymers (a) and (b) for a magnetic paint, used in the present invention, can be prepared according to any known polymerization process. From the viewpoint of the solubility of the polymer, the solution polymerization or the suspension polymerization using a lower alcohol such as methanol or ethanol solely or in combination with deionized water as the polymerization medium is preferably adopted. Furthermore, the emulsion polymerization is preferably adopted when a water-soluble salt of a strong acid radical containing sulfur or phosphorus is used. As the polymerization initiator used for the preparation of the copolymers, there can be mentioned organic peroxides such as lauroyl peroxide, diisopropyl peroxydicarbonate, di-2-ethylhexyl peroxydicarbonate, t-butyl peroxypivalate and 3,5,5-trimethylhexanoyl peroxides, azo compounds such as α,α'-azobisisobutyronitrile, and ammonium persulfate and potassium persulfate. As the suspending agent, there can be mentioned synthetic polymeric substances such as polyvinyl alcohol, partially saponified polyvinyl acetate, cellulose derivatives, e.g., methylcellulose, polyvinyl pyrrolidone, a maleic anhydride/vinyl acetate copolymer and polyacrylamide, and natural polymeric substances such as starch and gelatin. As the emulsifier, there can be mentioned anionic emulsifiers such as sodium alkylbenzenesulfonate and sodium laurylsulfate, and nonionic emulsifiers such as polyoxyethylene alkyl ether and partially esterified polyoxyethylene sorbitol fatty acid. A molecular weight modifier such as trichloroethylene or thioglycol can be used according to need. The above-mentioned polymerization initiator, vinyl chloride, other monomers, the suspending agent, the emulsifier and the molecular weight modifier can be collectively added to the polymerization system at the start of the polymerization, or these can be added dividedly during the polymerization. Usually, the polymerization is carried out at a temperature of 35° to 80° C. with stirring.

The obtained vinyl chloride copolymer, as for a usual vinyl chloride copolymer binder for a magnetic paint, is dissolved in an optional solvent to form a solution together with a polyurethane resin, a curing agent represented by a polyisocyanate, the magnetic powder and other ingredients, and the solution is coated on a non-magnetic support such as a polyester film.

A polyurethane obtained by reaction of a polyester polyol or polyether polyol with an isocyanate can be mentioned as a typical instance of the polyurethane resin, and a polyurethane resin having hydroxyl groups left therein is preferably used. To improve the dispersibility, a polyurethane resin having an ion-dissociative hydrophilic group such as COOM, $S_3M$, $S_4M$, $PO(PM)_2$ or $N^{\oplus}R_1R_2R_3X^{\ominus}$ is especially preferably used. If desired, a usual resin binder for a magnetic paint, such as a vinyl chloride/vinyl acetate copolymer resin, a cellulose resin, a phenoxy resin, an epoxy resin, a butyrol resin, an acrylic resin or an acrylonitrile/butadiene rubber, can be used in combination with the binder of the present invention, as long as the attainment of the objects of the present invention is not hindered.

As the magnetic powder, there can be mentioned powders of iron oxides such as $\gamma\text{-Fe}_2O_3$, $Fe_3O_4$, Co-containing $\gamma\text{-Fe}_2O_3$ and Co-containing $Fe_3O_4$, and magnetic metal powders such as Fe powder and Fe-CO powder.

Each of the vinyl chloride copolymers (a) and (b) used in the present invention has a hydroxyl group and can be crosslinked with an isocyanate compound, whereby a magnetic layer having a good durability and a sufficient degree of cross-linking can be obtained. Moreover, since one of the copolymers has a cationic hydrophilic group and the other contains an anionic hydrophilic group, the resins can be appropriately adsorbed on surfaces of different properties of the powders dispersed in a magnetic paint, such as a magnetic powder, a lubricant and carbon black, and thus, a magnetic paint having a good dispersion state can be stably prepared. By using this magnetic paint, a magnetic layer having a smooth surface and exhibiting good filling and orientation characteristics can be economically advantageously prepared.

The present invention will now be described in detail with reference to the following examples. In the examples, all of "parts" and "%" are by weight unless otherwise indicated.

Copolymer Synthesis Example 1

A deaerated autoclave was charged with 70 parts of vinyl chloride, 220 parts of methanol, and 1 part of α-cumylperoxyreodecanoate, and the temperature was elevated to 43° C. A mixture comprising 30 parts of vinyl chloride, 0.4 part of methacryloyloxyethyltrimethylammonium chloride 7 parts of 2-hydroxypropyl methacrylate, and 14 parts of methanol was continuously added into the autoclave over a period of 6 hours from the point just after initiation of the polymerization at 43° C. After 10 minutes from the point of termination of the addition, the reaction mixture was cooled, the unreacted vinyl chloride was recovered and the liquid was removed from the slurry. The residue was dried to obtain copolymer sample (A).

Copolymer Synthesis Example 2

An autoclave was charged with 120 parts of deionized water, 0.6 part of methylcellulose, 0.2 part of sodium lauryl sulfate and 1.2 parts of lauroyl peroxide, and after the deaeration, 100 parts of vinyl chloride, 8 parts of vinyl acetate, 5 parts of allyl 2-hydroxyethyl ether, 3 parts of diallyldimethyl ammoniumchloride, and 120 parts of methanol were added. Then the polymerization was initiated at 60° C. When the pressure was reduced to 3 kg/cm$^2$, the reaction mixture was cooled, the unreacted vinyl chloride was recovered and the liquid was removed, and the recovered copolymer was washed with cold water and dried to obtain copolymer sample (B).

Copolymer Synthesis Example 3

An autoclave was charged with 150 parts of deionized water, 1 part of azobisisobutyronitrile, 1 part of polyoxyethylen stearyl ether, and 0.1 part of methylcellulose, and after the deaeration, 60 parts of vinyl chloride, 5 parts of allyl 2-hydroxypropyl ether, 2 parts of monomethyl maleate, 8 parts of vinyl acetate, and 0.5 part of allyl glycidyl ether were added. Then the polymerization was initiated at 60° C. Over a period of from 3 hours after the initiation of the polymerization to 7 hours after the initiation of the polymerization, 40 parts of vinyl chloride was continuously charged into the autoclave, and when the pressure in the autoclave was reduced to 3 kg/cm$^2$, the reaction mixture was cooled, the unreacted vinyl chloride was recovered, and the residue was dehydrated, washed with deionized water, and dried to obtain copolymer sample (C).

Copolymer Synthesis Example 4

A polymerization vessel was charged with 150 parts of deionized water, 1 part of sodium lauryl sulfate, and 1 part of potassium persulfate, and after the deaeration, 60 parts of vinyl chloride, 3 parts of vinyl acetate, 3 parts of isobutyl vinyl ether and 6 parts of allyl 2-hydroxypropyl ether were further charged into the polymerization vessel, and the temperature was elevated to 60° C. to initiate the polymerization. Then, a liquid mixture comprising 2 parts of sodium styrenesulfonate and 50 parts of water was continuously charged into the polymerization vessel over a period of 10 hours, 40 parts of vinyl chloride in four divided parts was charged into the polymerization vessel, and the reaction was conducted for 10 hours. The unreacted vinyl chloride was recovered to obtain a polymerization liquid. Then, 100 parts of the polymerization liquid was mixed with 5 parts of methyl ethyl ketone, and the mixture was frozen and fused to recover a polymer. The recovered polymer was washed and dried to obtain copolymer sample (D).

Copolymer Synthesis Example 5

A polymerization vessel was charged with 200 parts of deionized water, 1 part of sodium lauryl sulfate, 1 part of potassium hydrogencarbonate, and 4 parts of potassium persulfate. After the deaeration, 7 parts of allyl glycidyl ether, 8 parts of allyl 2-hydroxyethyl ether, and 60 parts of vinyl chloride were further charged into the polymerization vessel, and the temperature was elevated to 53° C. to initiate the polymerization. During the polymerization, every time the pressure in the polymerization vessel was reduced to 5 kg/cm$^2$, 10 parts of vinyl chloride was added. This addition was conducted four times and 40 parts of vinyl chloride was added as a whole. When the inner pressure of the polymerization vessel was reduced to 3.5 kg/cm$^2$, the reaction mixture was cooled, the unreacted vinyl chloride was recovered, and the polymerization liquid was coagulated. The recovered polymer was thoroughly washed with warm water, dehydrated and dried to obtain copolymer sample (E).

Copolymer Synthesis Example 6

Copolymer Sample (F) was prepared in the same manner as described in Resin Example 1 except that ethyl methacrylate-2-phosphate (acid phosphoxyethyl methacrylate) was used instead of methacryloyloxyethyltrimethylammonium chloride.

The compositions of these copolymer samples and the compositions of commercially available vinyl chloride/vinyl acetate/maleic acid terpolymer (G) and vinyl chloride/vinyl acetate/vinyl alcohol terpolymer (H) are shown in Table 1.

2) Reactivity

The solution used at the pot life test was cast on a glass plate, and the obtained sheet was treated at 60° C. for 24 hours. Then, 0.5 g, precisely measured, of the sheet was mixed with 50 g of tetrahydrofuran for 24 hours, and the insoluble substance was recovered by filtration, washed and dried and the weight was precisely measured. The reactivity was expressed in terms of the gel proportion defined by the following formula.

$$Gel\ proportion\ (\%) = (weight\ of\ insoluble\ substance)/(weight\ of\ sample)$$

3) Heat Stability

The solution used at the solubility test was cast on a glass plate kept horizontal by a level to form a sheet having a thickness of 0.05 mm, and according to the method of JIS-K-6723, the sheet was heated in an oil bath at 80° C. The time required for discoloration of Congo Red paper was measured.

4) Gloss

A mixture comprising 400 parts of cobalt-covered iron oxide powder having a specific surface area of 30 m$^2$/g, 50 parts of the vinyl chloride copolymer, 40 parts of a polyurethane resin (1,4-butanediol adipate/MDI type) having a hydroxyl group content of 0.3% and a molecular weight of 70,000, 500 parts of methyl ethyl ketone, 300 parts of methyl isobutyl ketone, 300 parts of toluene, 2 parts of carbon black, 4 parts of alumina, 2 parts of myristic acid and 1 part of butyl stearate was

TABLE 1

| Copolymer Synthesis Example No. | 1 | 2 | 3 | 4 | 5 | 6 | | |
|---|---|---|---|---|---|---|---|---|
| Copolymer sample | A | B | C | D | E | F | G | H |
| Degree of polymerization | 300 | 370 | 450 | 400 | 340 | 330 | 400 | 430 |
| Composition | | | | | | | | |
| Content of nitrogen of quaternary ammonium salt in copolymer (%) | 0.04 | 0.08 | — | — | — | — | — | — |
| Anionic hydrophilic group and its equivalent | — | — | COOH 12,000 | SO$_3$Na 12,000 | SO$_4$K 17,000 | PO(OH)$_2$ 35,000 | COOH 5,600 | — |
| Content of hydroxyl group in copolymer (%) | 1.5 | 0.3 | 0.2 | 0.4 | 0.4 | 1.5 | — | 2.3 |
| Content of vinyl chloride in copolymer (%) | 86.5 | 88 | 88 | 90 | 88 | 86.5 | 86 | 91 |

Copolymer solutions, magnetic paints and magnetic tapes were prepared by using the foregoing copolymer samples and were evaluated according to the following methods. The results are shown in Table 2. Details of the vinyl chloride copolymers used are shown in Table 2.

1) Pot Life

In a mixed solvent comprising 200 parts of methyl ethyl ketone, 100 parts of methyl isobutyl ketone and 100 parts of toluene was dissolved 100 parts of the vinyl chloride copolymer at 65° C. with stirring for 1 hour, and a polyisocyanate (Coronate-L supplied by Nippon Polyurethane Kogyo) was added in an amount of 20 parts per 100 parts of the vinyl chloride copolymer to the above solution. The mixture was stored at 23° C. and the time (days) required to attain the state wherein the solution did not flow even when the container was turned upside down was measured as the pot life.

dispersed under high-speed shearing for 90 minutes. Then, 15 parts of a polyisocyanate (Coronate-L supplied by Nippon Polyurethane Kogyo) was added to the composition, and the composition was further stirred for 15 minutes to obtain a magnetic paint. The obtained magnetic paint was coated in a thickness of 5 μm on a polyester film, and the coating was subjected to the magnetic field orientation treatment and then dried. The reflectance of the obtained magnetic coating was measured to a reflection angle of 60° by a gloss meter. The gloss was expressed in terms of the reflectance.

5) Dispersion Stability

The solution used at the gloss test was allowed to stand for one hour and then coated in a thickness of 5 μm on a polyester film, and the coating was subjected to the magnetic field orientation treatment and then dried. The reflectance of the obtained magnetic coating was measured at a reflection angle of 60° by a gloss meter. The dispersion stability was expressed in terms of the reflectance.

6) Squareness (Br/Bm)

The magnetic coating used for the evaluation of the gloss was cut into a test piece having a size of 12.5 mm × 50 mm, and the squareness was measured by using a magnetic characteristic-measuring device.

7) Durability

The magnetic coating used for the evaluation of the gloss was smoothed by a calender roll, heat-treated at 65° C. for 65 hours and brought into contact with an abrasive paper-attached rotary drum under a load of 100 g. The rotary drum was rotated at 150 rpm, and the degree of sticking of the magnetic paint to the abrasive paper was observed with the naked eye and the durability was evaluated by three grades, A (good), B (fair) and C (poor).

TABLE 2

|  | Example | | | | | Comparative Example | | | |
| --- | --- | --- | --- | --- | --- | --- | --- | --- | --- |
|  | 1 | 2 | 3 | 4 | 5 | 1 | 2 | 3 | 4 |
| Details of vinyl chloride copolymer |  |  |  |  |  |  |  |  |  |
| Amount of quaternary ammonium salt-containing copolymer (a) (%) | (A) 50 | (A) 50 | (B) 50 | (B) 50 | (B) 50 | (A) 100 | — | (A) 67 | (A) 50 |
| Amount of hydrophilic group-containing copolymer (b) (%) | (C) 50 | (E) 50 | (F) 50 | (C) 50 | (D) 50 | — | (C) 100 | (G) 33 | *(H) 50 |
| Equivalent ratio [quaternary ammonium salt/anionic hydrophilic group] | 0.3 | 0.5 | 2.0 | 0.7 | 0.7 | ∞ | 0 | 0.3 | ∞ |
| Characteristics of solutions, magnetic paints, and magnetic tapes |  |  |  |  |  |  |  |  |  |
| Pot life (days) | 9 | 9 | 8 | 9 | 9 | 1 | >30 | 2 | 3 |
| Reactivity (%) | 90 | 91 | 91 | 89 | 90 | 82 | 85 | 60 | 91 |
| Heat stability (hours) | 7 | 72 | 3 | 46 | 46 | 0.5 | 45 | 0.5 | 8 |
| Gloss (%) | 102 | 105 | 102 | 105 | 105 | 90 | 75 | 98 | 60 |
| Dispersion stability (%) | 100 | 103 | 100 | 103 | 103 | 39 | 72 | 35 | 1 |
| Viscosity of paint (cP) | 1400 | 1200 | 1400 | 1300 | 1300 | 1400 | 2800 | 1500 | 1800 |
| Squareness (−) | 0.87 | 0.88 | 0.86 | 0.87 | 0.87 | 0.84 | 0.83 | 0.85 | 0.76 |
| Durability | A | A | A | A | A | A | A | B | C |

*Free of anionic hydrophilic group

We claim:

1. An improvement in a magnetic recording medium having a magnetic layer comprising a vinyl chloride copolymer as a binder and a magnetic powder and formed on a non-magnetic support, said improvement residing in the binder which is a mixture comprising (a) a vinyl chloride copolymer having (i) 0.02% to 0.5% by weight, calculated as nitrogen and based on the weight of the copolymer (a), of a quaternary ammonium salt and (ii) 0.05% to 3.0% by weight, based on the weight of the copolymer (a), of a hydroxyl group and (b) a vinyl chloride copolymer having (i) at least one anionic hydrophilic group selected from the group consisting of carboxylic acids, sulfur-containing acids, phosphorus-containing acids, and salts thereof, and (ii) 0.05% to 3.0% by weight, based on the weight of the copolymer (b), of a hydroxyl group; said vinyl chloride copolymers (a) and (b) having a degree of polymerization of 200 to 900, and the ratio of the vinyl chloride copolymer (a) to the vinyl chloride copolymer (b) being such that the equivalent ratio of the quaternary ammonium salt in the copolymer (a) to the anionic hydrophilic group in the copolymer (b) is from 0.2 to 5.

2. The magnetic recording medium according to claim 1, wherein the hydroxyl group in each of the vinyl chloride copolymers (a) and (b) is introduced in these copolymers by copolymerization of vinyl chloride with a hydroxyl group-containing monomer selected from the group consisting of (a) esters of $\alpha,\beta$-unsaturated acids, (b) esters of methacrylic or acrylic acid with polyalkylene glycols represented by the formula of $CH_2=CR-COO(C_nH_{2n}O)_mH$ in which m is an integer of from 2 to 9, n is an integer of from 2 to 4, and R represents a hydrogen atom or a methyl group, (c) mono-methacrylic or mono-acrylic esters of dihydroxyesters of dicarboxylic acids, (d) methacrylamides and acrylamides, (e) alkylene glycol esters of unsaturated carboxylic acids, (f) olefin alcohols, (g) vinyl ethers, (h) monomethallyl or monoallyl ether of alkylene glycols, (i) monomethallyl or monoallyl ether of polyoxyalkylene glycol, (j) monomethallyl or monoallyl ether of glycerol, (k) monomethallyl or monoallyl ether of halogen-substituted or hydroxyl-substituted alkylene or polyalkylene glycols, (l) monomethallyl or monoallyl ethers of polyhydric phenols and halogen-substituted products thereof, (m) methallyl or allyl thioethers of alkylene glycols, (n) vinyl alcohol, and (o) methallyl or allyl alcohol.

3. The magnetic recording medium according to claim 2, wherein the hydroxyl group-containing monomer is selected from the group consisting of the methallyl or allyl ethers (h), (i), (j), (k), (l), and (m).

4. The magnetic recording medium according to claim 1, wherein the vinyl chloride copolymer (a) containing the quaternary ammonium salt is prepared by copolymerization of vinyl chloride with a monomer containing a quaternary ammonium salt.

5. The magnetic recording medium according to claim 1, wherein the vinyl chloride copolymer (a) containing the quaternary ammonium salt is prepared by treating a vinyl chloride copolymer having an epoxy group with a tertiary amine, said vinyl chloride copolymer having an epoxy group having been prepared by copolymerizing vinyl chloride with an epoxy group-containing monomer or by epoxidization of double bonds formed by dehydrochlorination of a vinyl chloride copolymer.

6. The magnetic recording medium according to claim 1, wherein the vinyl chloride copolymer (b) containing the anionic hydrophilic group is prepared by copolymerization of vinyl chloride with at least one monomer selected from the group consisting of carboxylic acids, sulfur-containing acids, phosphorus-containing acids, and salts thereof.

7. The magnetic recording medium according to claim 1, wherein the content of the anionic hydrophilic group in the vinyl chloride copolymer (b) is such that the equivalent molecular weight of the copolymer (b) per anionic hydrophilic group is from 4,000 to 40,000.

8. The magnetic recording medium according to claim 1, wherein the magnetic layer further comprises a polyisocyanate as a curing agent.

* * * * *